United States Patent Office 3,363,023
Patented Jan. 9, 1968

3,363,023
PROCESS AND CATALYST FOR DEHYDRO-
GENATION OF NEOHEXANE
John Mooi, Homewood, and Glenn O. Michaels, South
Holland, Ill., assignors to Sinclair Research, Inc., New
York, N.Y., a corporation of Delaware
No Drawing. Continuation of application Ser. No.
376,252, June 18, 1964. This application Jan. 9,
1967, Ser. No. 608,221
15 Claims. (Cl. 260—683.3)

This application is a continuation of abandoned application Ser. No. 376,252, filed June 18, 1964.

This invention relates to the dehydrogenation, including dehydrocyclization, of hydrocarbons and more particularly to such dehydrogenation of hydrocarbons in the presence of a novel catalyst.

Chromia-alumina catalysts have long been used commercially for the dehydrogenation of paraffinic compounds to form olefins and/or diolefins. Quite frequently the system employed uses a catalyst containing from 10 to 20% $Cr_2O_3$ carried on a high area support such as activated alumina. Commonly, small amounts of alkali metal oxides are added to neutralize the acid sites on the catalyst to minimize cracking reactions. These catalysts have been used in such processes as the production of butenes and butadiene from n-butane, isoprene from isopentane or isoamylenes, styrene from ethyl benzene and a number of similar dehydrogenation reactions. It is characteristic of these reactions that as the number of carbon atoms in the reactant material is increased above four, the material becomes increasingly more difficult to dehydrogenate without producing large amounts of less desirable by-products. The greater chain length increases the possibility of cracking of the reactant to lighter materials as well as the possibility of skeletal isomerization or double bond migration. It becomes increasingly more important with the higher molecular weight materials to use catalysts which are adapted to a specific reaction or group of reactions.

We have found that whereas chromia-alumina catalysts may be used advantageously for the dehydrogenation of n-butane they become much less selective with $C_5$, $C_6$ and higher paraffins. In particular, the dehydrogenation of neohexane over $Cr_2O_3$–$Al_2O_3$ catalysts results in a large amount of isomeric $C_6$ olefins or diolefins other than the desired alpha olefin, 3,3-dimethylbutene-1. It is generally felt that the isomerization of the neohexene to other $C_6$ olefins over these catalysts is the reaction which limits the yield of neohexene to values far below the equilibrium amounts expected. A number of commercial and exploratory $Cr_2O_3$–$Al_2O_3$ catalysts have been tested but in every case large amounts of these undesirable by-products have been formed.

Current interest has also been expressed in the production of specific aromatic compounds by the dehydrogenation, referred to in the art as dehydrocyclization, of appropriate aliphatic paraffins or olefins. Chromia-alumina type catalysts have been most commonly used for this reaction although other types of catalysts have been used occasionally. Two major disadvantages of this approach to the preparation of aromatics are first, selectivity to aromatization for most catalysts is poor and second, the selectivity to the specific desired product is often so low that elaborate separation procedures are required.

It has now been discovered that such dehydrogenation of hydrocarbons in the presence of the novel catalyst of this invention considerably minimizes isomerization of all types, i.e. skeletal isomerization and double bond migration, so that higher yields and selectivities of the desired product are obtained. The catalyst of the present invention consists essentially of $Cr_2O_3$, MgO, alkali metal oxide and alumina. The amount of $Cr_2O_3$ will usually fall in the range of at least about 1 or 5 to 40 percent by weight, preferably about 10 to 20 percent by weight. The amount of MgO can also vary widely say from about 1 to 40 percent, preferably about 1 to 20 percent by weight. The amount of alkali metal oxide present is very important as too little alkali metal oxide does not prevent isomerization and too much alkali metal oxide causes increased coke yields and lower activity. Acceptable results are usually obtainable when about 0.1 to 4 percent by weight preferably 0.1 to 2 percent by weight alkali metal as the alkali metal oxide, is present. It should be appreciated, however, that the most advantageous level of alkali metal oxide may vary from catalyst to catalyst and for best results should be determined in every specific case. For example, when a magnesium aluminate spinel is employed, the most advantageous results are obtained with about 0.4 to 0.6 percent by weight alkali metal, whereas when the MgO is provided by impregnation of an essentially alumina support usually about 0.8 to 2 percent by weight alkali metal gives best results. The preferred alkali metal oxide is sodium oxide, although other alkali metal oxides, i.e. the oxides of potassium, cesium and rubidium can also be used. The essential balance of the catalyst is activated alumina, including the mixed oxide or magnesium aluminate spinel forms.

In accordance with the process of the present invention the hydrocarbon to be dehydrogenated is contacted under dehydrogenation conditions with the novel catalyst. The dehydrogenation process is conducted in the vapor phase under an elevated temperature, for instance, about 900 to 1250° F., preferably about 1000 to 1150° F., and a hydrocarbon pressure of up to about 2 atmospheres or more. Generally, increased selectivities are obtained at hydrocarbon pressures below atmospheric, say down to about 0.05 atmosphere or below with a hydrocarbon pressure of about 0.1 to 0.5 atmosphere being preferred for economic reasons. If desired, an inert diluent or vacuum can be employed to reduce the hydrocarbon partial pressure of the hydrocarbon feed. Various essentially inert gaseous diluents can be employed but it is preferred to use nitrogen, hydrogen or methane. The inert gas is usually present in an amount of about 0.5 to 50 moles, preferably about 5 to 25 moles, per mole of hydrocarbon feed. The contact time or weight hourly space velocity will vary depending on the temperature and pressure employed but will generally range from about 0.1 to 5, preferably 0.25 to 1.0 WHSV.

The alumina component which constitutes the essential balance of the catalyst composition is the catalyst base, and preferably the major component. Activated or gamma-family aluminas can be employed such as those derived by calcination of amorphous hydrous alumina, alumina monohydrate, alumina trihydrate or their mixtures. Advantageously the alumina precursor may be a mixture predominating in, for instance, about 65 to 95% by weight, in one or more of the alumina trihydrates: bayerite I (randomite or nordstrandite) or gibbsite, and about 5 to 35% by weight alumina monohydrate (boehmite), amorphous alumina or their mixture. Catalyst bases of this type are disclosed in U.S. Patent No. 2,838,-444 and 2,838,445. The alumina base may also contain small amounts of other solid oxides.

The MgO component of the catalyst can be provided through a MgO-containing alumina base as, for example, the magnesium aluminate spinel prepared by known methods. A preferred method of obtaining a suitable magnesium aluminate spinel is described in U.S. Patent No. 2,992,191 to Henry Erickson. In this method the support is formed by reacting in an aqueous medium a soluble magnesium inorganic salt and a soluble aluminum salt in which the aluminum is present in the anion. Suitable salts are exemplified by the water-soluble strongly acidic magnesium salts such as the chloride, nitrate or sulfate and the water-soluble alkali metal aluminates. The magnesium and aluminate salts are dissolved in an aqueous medium, and a spinel precursor is precipitated through neutralization of the aluminate by the acidic magnesium salt. Excesses of acid salt or aluminate are preferably not employed, thus avoiding the precipitation of excess alumina or magnesia. The dried spinel precursor is not a magnesium spinel but rather is probably a mixture such as gibbsite and brucite. Calcination of the precursor at suitable calcining temperatures ranging, for instance, from about 800 to 1300° F. or more, converts at least a substantial portion of the precursor to a crystalline spinel. Spinels containing from about 1 to 40% by weight of MgO, preferably about 1 to 20%, with the essential balance being $Al_2O_3$ may be used as supports for the preparation of the catalyst of the invention.

Impregnation of the alumina base with the catalytically active metal components can be by known methods. For instance, the base can be mixed with an aqueous solution of a water-soluble salt of the catalytically active components of the invention to absorb all or part of the solution in the support which is then dried and calcined, for instance, at the temperatures noted above. Alternatively, the active components can be precipitated on the support through neutralization of a slurry of the support and water-soluble compounds of the catalytically active metals and then drying and calcining. Calcining activates the catalyst and, if not already present as the oxides of chromium, alkyl metal and magnesium, converts the catalytically active metal components to their oxide form. The impregnation with the catalytically active components can be done separately or simultaneously.

If desired, the alumina base can be ground before addition of the catalytic metals and the resulting material formed, if desired, into larger particles, impregnated and dried before effecting the calcination which gives the final catalyst. Alternatively, the base particles can be directly impregnated, dried and calcined; or, directly impregnated, ground and formed into shaped particles by tabletting or extrusion and then recalcined. It is preferred to calcine the alumina or MgO-containing alumina prior to addition of the catalytically active components. After the catalytically active components are added to the base, the resulting catalyst compositions can be activated by drying and calcination, for instance, under a temperature ranging from 800 to 1300° F. or more.

The feeds of the present invention are aliphatic hydrocarbons of 2 to 20 or more carbon atoms, often of 4 or 5 to 12 carbon atoms. The feeds are usually non-acetylenic and often are saturated or olefinically unsaturated hydrocarbons. Whether the reaction or principle reaction occurring is a straight dehydrogenation as opposed to dehydrocyclization will be dependent in large part upon the feed selected. Both dehydrogenation to create one or two double bond-containing products and dehydrocyclization may occur with some feeds.

Should non-cyclic monoolefins and/or diolefins be the desired products the preferred feeds are aliphatic hydrocarbons of 4 to 6 carbon atoms although as aforementioned they can have up to 12 or 20 carbon atoms. The feeds can be unsaturated but the preferred feeds are the normal and branched chain paraffins including the cyclic paraffins such as cyclopentane and cyclohexane. Equally suitable are aromatic feeds containing at least one or more dehydrogenatable aliphatic hydrocarbon group, e.g. a lower alkyl group say of 1 to 4 carbon atoms such as ethylbenzene. Among the unsaturated feeds which can be used are the olefins of $C_4$ to $C_6$ range which undergo dehydrogenation to yield dienes. Perhaps the greatest advantage with respect to yields and selectivities of desired product is obtained with the branched feeds of at least five carbon atoms, usually up to 12 carbon atoms which contain a "neo" or quaternary carbon atom.

In dehydrocyclization reactions the feed is usually a non-acetylenic, aliphatic hydrocarbon of 6 to 10 or up to say 20 carbon atoms and can be saturated or unsaturated. The preferred feeds for dehydrocyclization are branched chain hydrocarbons containing a chain length of at least 5 carbon atoms and at least 2 branched lower alkyl chains. Particularly preferred are the saturated branched feeds containing a quaternary carbon atom and a chain length of at least 5 carbon atoms. Also suitable feeds for dehydrocyclization are naphthenes including gem naphthenes and aromatic hydrocarbons substituted with at least one aliphatic hydrocarbon e.g. alkyl group of 6 or more carbon atoms.

The following examples are included to further illustrate the present invention but are not to be considered limiting.

Example 1

3600 g. of $Mg(NO_3)_2 \cdot 6H_2O$ was dissolved in deionized water. 314 ml. of concentrated $HNO_3$ was added and the solution was diluted to 8 liters. 3340 g. of sodium aluminate (42.9% $Al_2O_3$, 30.6% $Na_2O$) was dissolved in deionized water and filtered through cloth on a 10 in. Buchner funnel using "Celite" as a filter aid. The sodium aluminate solution was diluted to 8 liters with deionized water. The $Mg(NO_3)_2$ and the sodium aluminate solution were run simultaneously into 32 liters of deionized water stirred rapidly with an air-driven stirrer. The pH was held between 6 and 8 during the addition until the $Mg(NO_3)_2$ solution was all added. 42 minutes were required for the addition. All but 600 ml. of the sodium aluminate solution was then added and the final pH was 8.4. The slurry was filtered on a plate-frame filter press and back-washed for 2 hours with deionized water. The cake was reslurried in about 7.5 gallons of deionized water containing 26 g. of dissolved $Mg(NO_3)_2 \cdot 6H_2O$. The slurry was again filtered, and was washed two more times by the same slurry-filter method. The cake was finally dried overnight in a forced-air drying oven at about 220° F.

The oven-dry material was ground through a screen with 0.012 inch openings on a hammer mill. The powder was placed in a Simpson Intensive Mixer, mixed dry with 20 g. of starch and 30 g. of methyl cellulose, and then mixed with 800 ml. of deionized water to form a dough suitable for extrusion. The dough was extruded through a die plate with 1/16" diameter openings using a Welding Enngineers twin-worm extruder. The extrudate was dried in a forced-air drying oven, was broken to less than 3/8 inch lengths, and was made free of fines by screening on a 14 mesh sieve. The $MgO-Al_2O_3$ extrudate was calcined in a muffle furnace programmed to heat to 900° F. at 200° F./hr. and then maintained at 900° F. for 3 hours. 187 g. of the calcined extrudate was vacuum impregnated with a solution made by dissolving 62.3 g. $CrO_3$ and 3.7 g. NaOH in deionized water, adding 21 ml. of concentrated $NH_4OH$ solution, and diluting to 225 ml. The wet catalyst was spread out on a 12 x 18 inch Pyrex tray and dried in a forced-air drying oven. The oven-dry catalyst was calcined in a tube furnace at 1400° F. for 5 hours in a flowing mixture of about 20% steam in air and then for 1 hour in flowing dry air. 215 g. of catalyst was recovered and the catalyst was designated Sample No. 900-947-5069. The catalyst analyzed 0.77% volatile matter at 1000° C., 18.1% $Cr_2O_3$, and 0.743% Na.

A portion of the catalyst thus-prepared was charged to a 1 inch Universal type reactor and used for the conversion of neohexane to neohexene. The catalyst was raised to operating temperature in a slow stream of nitrogen. Neohexane was then introduced to the reactor without any further pretreat of the catalyst. After each run, the reactor was purged 15 minutes with $N_2$ and the coke burned off from the catalyst with an air-$N_2$ mixture. Maximum temperature during regeneration was held to 1100° F. Data on this catalyst are summarized in Table I.

Selectivities were calculated according to the following equation:

(1)

$$\text{Mole Percent Selectivity} = \frac{\text{Wt. percent of Neohexene in Product} \times \frac{86.2}{84.2} \times 100}{\text{Wt. percent of Neohexane in Feed} - \text{Wt. Percent Neohexane in product}}$$

The total conversion was calculated according to the equation:

(2)

$$\text{Total Conversion} = \frac{\text{Wt. percent Neohexane in Feed} - \text{Wt. percent Neohexane in Product} \times 100}{\text{Wt. percent Neohexane in Feed}}$$

in deionized water, adding 21 ml. of concentrated $NH_4OH$ solution, and diluting to 225 ml. The catalyst was dried and calcined in the same manner as the catalyst of Example I. The recovery was 209 g. and the catalyst was designated Sample No. 900–947–5073, and analyzed 0.62 volatile matter at 1000° C., 16.5% $Cr_2O_3$, 0.420% Na, 23.1% MgO.

A portion of the catalyst thus prepared was charged to a 1 inch Universal type reactor and used for the conversion of neohexane to neohexene. The conditions employed were those shown in Table II. The results obtained are summarized in Table II.

TABLE II

Catalyst—$MgAl_2O_4$-$Cr_2O_3$(+)0.42% Na (as $Na_2O$)
Feed—Neohexane

| Run No. 1394 | 27 | 31 | 34 | 38 |
|---|---|---|---|---|
| Conditions: | | | | |
| Temperature, ° F | 1,048 | 1,047 | 972 | 1,000 |
| WHSV | 0.46 | .97 | 1.08 | .49 |
| Pressure, mm. Hg | 74 | 100 | 77 | 81 |
| Length of Run, min | 30 | 15 | 30 | 30 |
| Yield, Wt. Percent on Feed: | | | | |
| $H_2$ | 1.66 | 1.33 | 0.22 | .91 |
| $C_1$ | 1.13 | .81 | .13 | .46 |
| $C_2$ | 2.90 | 1.98 | .41 | 1.20 |
| $C_3$ | .04 | .18 | .03 | .08 |
| $C_4$ | 7.43 | 5.51 | 1.31 | 3.91 |
| $C_5$ | 2.78 | 1.81 | .28 | 1.03 |
| 3,3-dimethylbutene-1 | 17.88 | 16.78 | 9.84 | 14.99 |
| 2,2-dimethylbutane | 59.64 | 66.98 | 87.02 | 73.74 |
| $C_6$ Olefins and/or Diolefins | 3.13 | 2.84 | .75 | 2.36 |
| Coke | 3.42 | 1.79 | Trace | 1.32 |
| Total Conversion Wt. Percent | 40.06 | 32.7 | 12.56 | 25.9 |
| Selectivity to Neohexene | 45.93 | 52.9 | 80.60 | 59.5 |
| Yield o Neohexene per pass | 17.88 | 16.78 | 9.84 | 14.99 |

*Example III*

A third $MgAl_2O_4$-$Cr_2O_3$ catalyst was prepared according to the directions given in Example I except that the addition of NaOH was omitted during the impregnation of the $MgAl_2O_4$ extrudate. The catalyst was given a three-hour calcination at 1200° F. and charged to a 1 inch Universal type reactor for evaluation. Final analysis on the finished catalyst was: 20.4% $Cr_2O_3$, 22.3% MgO, <0.005% Na and 1.6% V.M. Coke was burned off the

TABLE I

Catalyst—$MgAl_2O_4$-$Cr_2O_3$(+)0.74% Na (as $Na_2O$)
Feed—Neohexane

| Run No. 1394 | 18 | 19 | 21 | 22 | 24 | 25 |
|---|---|---|---|---|---|---|
| Conditions: | | | | | | |
| Temperature, ° F | 926 | 980 | 1,050 | 1,051 | 1,097 | 1,084 |
| WHSV | 0.43 | 0.44 | 0.43 | .87 | 1.78 | 1.74 |
| Pressure, mm. Hg | 76 | 75 | 76 | 104 | 104 | 73 |
| Time of run, min | 30 | 30 | 30 | 30 | 30 | 7.5 |
| Yield, Wt. Percent on Feed: | | | | | | |
| $H_2$ | 0.08 | .26 | .45 | 1.90 | 0.90 | 2.01 |
| $C_1$ | .08 | .20 | .77 | 1.17 | .95 | .39 |
| $C_2$ | .39 | .81 | 2.01 | 2.61 | 2.75 | 2.32 |
| $C_3$ | .03 | .03 | .18 | .20 | .11 | .08 |
| $C_4$ | .94 | 2.50 | 6.98 | 6.19 | 6.16 | 8.35 |
| $C_5$ | .21 | .50 | 1.00 | 1.29 | 1.42 | 1.31 |
| 3,3-dimethylbutene-1 | 2.68 | 7.49 | 15.46 | 13.26 | 7.68 | 13.34 |
| 2,2-dimethylbutane | 94.9 | 86.88 | 62.94 | 67.36 | 76.31 | 65.79 |
| $C_6$ Olefins and/or Diolefins | .37 | .64 | 1.97 | 1.09 | .68 | 1.55 |
| Coke | .35 | .70 | 8.23 | 4.91 | 3.03 | 4.87 |
| Total Conversion, Wt. percent | 4.4 | 12.41 | 39.63 | 31.86 | 23.31 | 33.88 |
| Selectivity to Neohexene, mole percent | 63.5 | 62.29 | 38.45 | 42.66 | 33.91 | 40.52 |
| Yield of Neohexene per pass | 2.7 | 7.5 | 15.46 | 13.26 | 7.68 | 13.34 |

*Example II*

In accordance with the general method of Example I a second catalyst was prepared by the vacuum impregnation of 192 g. of the calcined $MgO$-$Al_2O_3$ extrudate with a solution made by dissolving 62.3 g. $CrO_3$ and 1.9 NaOH catalyst and the catalyst was subjected to an additional calcination for 5 hours at 1400° F. in air saturated with water. The catalyst was purged for 1 hour in dry air and then recharged to the reactor. Data on the steamed and unsteamed catalyst in dehydrogenating neohexane are given in Table III.

TABLE III

| | Catalyst | | | |
|---|---|---|---|---|
| | $MgAl_2O_4$-$Cr_2O_3$ | | $MgAl_2O_4$-$Cr_2O_3$ (steamed) | |
| Run No. 1394 | 6 | 7 | 11 | 12 |
| Conditions: | | | | |
| Temperature, °F | 934 | 934 | 925 | 994 |
| WHSV | .43 | .25 | .46 | .46 |
| Pressure, mm. Hg | 77 | 74 | 77 | 80 |
| Length of run, min | 30 | 30 | 30 | 30 |
| Yield, Wt. Percent on Feed: | | | | |
| $H_2$ | .39 | .60 | .42 | 1.04 |
| $C_1$ | .22 | .37 | .13 | .57 |
| $C_2$ | .48 | .50 | .15 | .67 |
| $C_3$ | .06 | .10 | .04 | .15 |
| $C_4$ | 1.33 | 1.71 | .63 | 2.22 |
| $C_5$ | .31 | .57 | .15 | 1.62 |
| 3,3-dimethylbutene-1 | 7.08 | 9.30 | 6.25 | 8.85 |
| 2,2-dimethylbutane | 87.51 | 80.41 | 88.22 | 72.41 |
| $C_6$ Olefins and/or Diolefins | 1.89 | 4.56 | 4.01 | 11.42 |
| Coke | .74 | 1.88 | Neg. | 1.06 |
| Total Conversion, Wt. Percent | 12.1 | 18.9 | 11.06 | 27.00 |
| Selectivity to Neohexene | 60.3 | 50.7 | 58.33 | 33.84 |
| Yield of Neohexene per pass | 7.08 | 9.30 | 6.25 | 8.85 |

*Example IV*

A commercial dehydrogenation Catalyst A, composed approximately of 20 weight percent $Cr_2O_3$, 0.2 weight percent Na (as sodium oxide) on alumina was charged to a 1 inch Universal type reactor and used for the conversion of neohexane to neohexene as in Examples I, II and III. These data are summarized in Table IV.

TABLE IV

| | Catalyst | | |
|---|---|---|---|
| | Alumina-Chromia-$Na_2O$ | | A |
| Feed | Neohexane | | |
| Run No. 1337 | 54 | 57 | 59 | 60 |
| Conditions: | | | | |
| Temperature, °F | 974 | 975 | 1,050 | 1,016 |
| WHSV | .31 | .59 | .60 | .30 |
| Pressure, mm. Hg | 76 | 84 | 89 | 76 |
| Length of Run, min | 30 | 30 | 30 | 30 |
| Yield Wt. Percent on Feed: | | | | |
| $H_2$ | .96 | .51 | 1.45 | 1.77 |
| $C_1$ | .67 | .34 | 1.24 | 1.38 |
| $C_2$ | .92 | .50 | 1.95 | 1.65 |
| $C_3$ | .19 | .08 | .22 | .30 |
| $C_4$ | 2.49 | 1.32 | 4.00 | 3.24 |
| $C_5$ | 1.61 | 1.10 | 2.33 | 2.04 |
| 3,3-dimethylbutene-1 | 9.92 | 8.16 | 9.95 | 11.11 |
| 2,2-dimethylbutane | 77.38 | 83.05 | 69.33 | 65.67 |
| $C_6$ Olefins and/or Diolefins | 4.36 | 3.85 | 4.87 | 6.33 |
| Coke | 1.54 | 1.09 | 4.66 | 6.38 |
| Total Conversion, Wt. Percent | 22.62 | 16.95 | 30.67 | 34.33 |
| Selectivity to Neohexene, Mole Percent | 44.90 | 49.29 | 33.25 | 33.13 |
| Yield of Neohexene per pass | 9.92 | 8.16 | 9.95 | 11.11 |

Examination of the data of Tables I to IV clearly demonstrates the superiority of the $Cr_2O_3$-$Na_2O$ on magnesium aluminate catalyst of the invention over the commercial $Cr_2O_3$-$Na_2O$ on alumina catalyst in the selectivities obtained at given conversion levels. The data of Tables I, II and III, moreover, illustrate the importance of the presence of alkali metal oxide components in reducing isomerization and that there is an important sodium level, significant deviation from providing a decrease in selectivity. Close examination of Tables I to III also shows that as the amount of sodium increases, the coke at a given conversion also increases. The net result of adding alkali metal oxide in the range of the present invention is, therefore, a slight increase in coke production coupled with unexpectedly substantial decrease in isomerization. This shows that there is a maximum in the selectivity of the catalyst at a more or less specific sodium level which will vary from catalyst to catalyst and should be determined in each circumstance.

The primary effect of the addition of the alkali metal oxide to the catalysts is the reduction of the amount of neohexene which is isomerized to other $C_6$ olefins and/or diolefins. In Table V below, the ratio of "isomeric $C_6$" compounds to neohexene obtained in the runs with the commercial $Al_2O_3$-$Cr_2O_3$-$Na_2O$ catalyst (Example IV) is presented along with the runs in Examples I, II and III which employed the $MgAl_2O_4$-$Cr_2O_3$-$Na_2O$ and $MgAl_2O_4$-$Cr_2O_3$ catalysts. The ratios summarized in Table V show that as the amount of sodium on the catalyst increases, the "isomeric $C_6$" ratio progressively declines.

TABLE V

["Isomeric $C_6$'s" to neohexene ratio][1]

| Catalyst | | | | | | | |
|---|---|---|---|---|---|---|---|
| Commercial Catalyst | | MgAl$_2$O$_4$-Cr$_2$O$_3$ Base | | | | | |
| Sodium Level, Wt. Percent | | | | | | | |
| 0.2 | | 0.74 | | 0.42 | | 0.0 | |
| Run No. | I-C$_6$/Neohexene | Run No. | I-C$_6$/Neohexene | Run No. | I-C$_6$/Neohexene | Run No. | I-C$_6$/Neohexene |
| 54 | .44 | 18 | .14 | 27 | .18 | 6 | .27 |
| 57 | .47 | 19 | .09 | 31 | .17 | 7 | .49 |
| 59 | .49 | 21 | .13 | | | 11 | .64 |
| 60 | .57 | 24 | .09 | | | 12 | .90 |
| | | 25 | .12 | | | | |

[1] The term "isomeric $C_6$'s" includes a number of $C_6$ olefins and diolefins such as 2,3-dimethyl-1-butene, 2,3-dimethyl-2-butene, 4-methyl-1-pentene, 4-methyl-2-pentene-cis and trans, 2,3-dimethyl-1,3-butadiene, and a number of unresolved methyl pentadienes (plus traces of benzene, toluene and xylenes) but for purposes of illustration are lumped together under the term "isomeric $C_6$'s."

As important is the product distribution within the "isomeric $C_6$" group itself. With the commercial Al$_2$O$_3$-Cr$_2$O$_3$-Na$_2$O catalyst, the predominant compounds among the "isomeric $C_6$'s" (as shown in Table IV) are methylpentadienes and methylpentenes. The catalyst of the present invention as shown by the Examples I and II not only substantially diminishes the isomerization of neohexene to methylpentenes but also minimizes other isomerization reactions such as neohexene to other dimethylbutenes.

*Example V*

A Cr$_2$O$_3$-MgO on alumina and several Cr$_2$O$_3$-MgO-Na$_2$O on alumina catalysts were prepared as follows:

A. 2100 g. of alumina trihydrate powder (Bayerite) was mixed dry with 7 g. of soluble starch and 7 g. of methyl cellulose in a Simpson Intensive Mixer. A solution of 368 g. of Al(NO$_3$)$_3$·9H$_2$O in 220 ml. of deionized water was added in small portions with short periods of mixing between additions. About 30 min. of mixing was given after the final addition. A dough formed which extruded easily with a Welding Engineers twin-worm extruder. Both 1/16 in. and 1/8 in. diameter extrudate was prepared. The extrudate was dried in a forced-air drying oven at about 230° F. The 1/16 in. extrudate was broken to less than 3/8 in. lengths and screened to free it from particles greater than 8 mesh and smaller than 14 mesh. The 1/8 in. extrudate was broken to less than 1/2 in. lengths and screened to free it from particles greater than 4 mesh and smaller than 8 mesh. The extrudates were calcined in a muffle furnace heated to 600° F. at 30° F./hr., then to 1050° F. at about 100° F./hr., and then maintained at 1050° F. for 3 hours.

B. A solution was prepared by dissolving 26.4 g. of MgO in 132 g. of CrO$_3$ in deionized water and diluting to 240 ml. This solution was used to vacuum impregnate 199 g. of 1/16 in. calcined alumina extrudate prepared as described in section A. The alumina was held in contact with the solution for 3 hours, was then filtered out and dried overnight in a forced air drying oven at about 230° F. The over-dry catalyst was calcined at 1400° F. for 5 hrs. in an atmosphere of about 20% steam in air and then for 1 hr. at 1400° F. in dry air. 246 g. were recovered. Sample No. 900-947-5075.

*Analysis.*—0.39% volatile at 1000° C., 2.54% MgO, 18.0% Cr$_2$O$_3$.

C. 200 g. of 1/16 in. calcined alumina extrudate prepared as described in section A was vacuum impregnated with a solution made by dissolving 132 g. of CrO$_3$, 26.4 g. of MgO, and 4.0 g. of NaOH in deionized water to make 240 ml. The alumina was held in contact with the solution for about 3 hours, was then filtered out and dried overnight in a forced air drying oven at about 230° F. The oven-dry catalyst was calcined at 1400° F. for 5 hrs. in an atmosphere of about 20% steam in air and then for 1 hour at 1400° F. in dry air. 246 g. were recovered. Sample No. 900-947-5084.

*Analysis.*—1.21% volatile at 1000° C., 17.2% Cr$_2$O$_3$, 1.94% MgO, 0.378% Na.

D. 200 g. of 1/16 in. calcined alumina extrudate prepared as described in section A was vacuum impregnated with a solution of 5.8 g. of NaHCO$_3$ in deionized water to make 240 ml. The alumina was held in contact with the solution for about 5 hrs., was then filtered out and dried overnight in a forced-air drying oven at about 230° F. The oven-dry material was calcined 6 hrs. at 900° F., cooled, and vacuum impregnated with a solution made by dissolving 66 g. of CrO$_3$, 13.2 g. of MgO, and 2.0 g. of NaOH in deionized water to make 120 ml. The impregnated extrudate was dried in a forced-air drying oven at about 230° F., and was then calcined at 1400° F. for 5 hrs. in an atmosphere of about 20% steam in air and then for 1 hour at 1400° F. in dry air. 265 g. of catalyst was recovered. Sample No. 900-947-5087.

*Analysis.*—1.82% volatile at 1000° C., 19.4% Cr$_2$O$_3$, 3.02% MgO, 0.84% Na.

E. 1/8 in. calcined alumina extrudate prepared as described in section A was impregnated in the same manner as described in section D. Sample No. 900-947-5091 was assigned to the 1/8 in. diameter catalyst.

*Analysis.*—1.48% volatile at 1000° C., 17.9% Cr$_2$O$_3$, 0.680% Na, 3.54% MgO.

F. 200 g. of 1/16 in. calcined alumina extrudate prepared as described in section A was impregnated in the same manner as described in section D except that 11.6 g. of NaHCO$_3$ was used in the first impregnation step. Sample No. 900-947-5095.

*Analysis.*—0.41% volatile at 1000° C., 18.4% Cr$_2$O$_3$, 3.48% MgO, 1.43% Na.

G. 1050 g. of alumina trihydrate powder (Bayerite), 48 g. of MgO (calcined magnesite), 3.5 g. of soluble starch and 3.5 g. of methyl cellulose were mixed in the Simpson Intensive Mixer with 284 g. of Al(NO$_3$)$_3$·9H$_2$O dissolved in 170 ml. of deionized water. After 1 1/4 hours mixing, 65 ml. of deionized water was added. In 1/2 hr. of additional mixing a dough formed which was extruded 1/16 in. diameter with a Welding Engineers twin-worm extruder. The extrudate was dried in a forced-air drying oven at about 230° F., cooled, and broken to less than 3/8 in. lengths. Catalyst fines were removed through a 14 mesh screen. The extrudate was calcined in a muffle furnace heated to 600° F. at 30° F./hr., then to 1050 F. at about 100° F./hr., and then maintained at 1050° F. for 3 hrs. 180 g. of the calcined 1/16 in. MgO-Al$_2$O$_3$ extrudate was vacuum impregnated with a solution of 58.5 g. of CrO$_3$, 1.8 g. of NaOH, and 20 ml. concentrated NH$_4$OH in deionized water to make 100 ml. The impregnated extrudate was dried in a forced air drying oven at about 230° F. and was then calcined at 1400° F. for 5 hours in an atmosphere of about 20% steam in air and finally for 1 hr. at 1400° F. in dry air. 211 g. were recovered. Sample No. 900-947-5096.

*Analysis.*—0.74% volatile at 1000° C., 19.5% Cr$_2$O$_3$, 3.51% MgO, 0.47% Na.

*Example VI*

Portions of catalysts described in Example V were charged to a 1 inch Universal reactor and evaluated in the conversion of neohexane to neohexene as described in Example I. The reaction conditions and results are shown in Table VI below.

hexene. With no sodium on the catalyst, the activity is excellent but selectivity is poor due mainly to the isomerization of neohexene to other C$_6$ isomers as fast as it is formed. The data also show that catalyst selectivity increases rapidly with the addition of small amounts of sodium and appears to level off between 0.8 to 1.4% sodium (as the oxide) on the catalyst.

It is claimed:
1. A catalyst composition consisting essentially of about 1 to 40% by weight Cr$_2$O$_3$, about 1 to 40% by weight MgO, about 0.1 to 4% by weight alkali metal as the alkali metal oxide, and an essential balance of activated alumina.
2. The catalyst composition of claim 1 wherein the alkali metal oxide is sodium oxide.
3. The catalyst composition of claim 1 containing about 10 to 20% by weight Cr$_2$O$_3$, about 1 to 20% by weight MgO and about 0.8 to 2% by weight alkali metal as the alkali metal oxide.
4. A catalyst composition consisting essentially of about 10 to 20% by weight Cr$_2$O$_3$ and about 0.1 to 2% by weight alkali metal as the alkali metal oxide on a

TABLE VI

| Cat. No. | 900-947-5075 | | 900-947-5084 | | 900-947-5087 | |
|---|---|---|---|---|---|---|
| Cat. Composition | MgO-Cr$_2$O$_3$ on Al$_2$O$_3$+0.0% Na | | MgO-Cr$_2$O$_3$ on Al$_2$O$_3$+0.4% Na | | MgO-Cr$_2$O$_3$ on Al$_2$O$_3$+0.8% Na | |
| Feed | Neohexane (pure grade) | | | | | |
| Run No. 1394 | 40 | 41 | 55 | 56 | 61 | 65 |
| Conditions: | | | | | | |
| Temperature, °F | 1,051 | 1,002 | 1,000 | 925 | 997 | 1,005 |
| WHSV | .34 | .34 | .33 | .33 | .31 | .60 |
| Pressure, mm. Hg | 75 | 78 | 72 | 73 | 73 | 80 |
| Length of Run, min | 30 | 15 | 30 | 30 | 30 | 30 |
| Material Balance, Wt. Percent | 98.0 | 94.9 | 100.2 | 97.9 | 101.0 | 99.4 |
| Yield, Wt. Percent on Feed: | | | | | | |
| H$_2$ | 4.35 | 1.48 | 2.67 | 1.30 | 2.99 | 1.22 |
| C$_1$ | 5.05 | 3.23 | 2.27 | .93 | .98 | .44 |
| C$_2$ | 3.83 | 1.82 | 1.40 | .43 | 1.33 | .89 |
| C$_3$ | 1.25 | 1.11 | .77 | .37 | .31 | .18 |
| C$_4$ | 6.56 | 4.22 | 4.17 | 1.81 | 4.49 | 3.57 |
| C$_5$ | 4.68 | 4.69 | 2.66 | 1.31 | .70 | .61 |
| 3,3-dimethylbutene-1 | 1.02 | 1.56 | 10.40 | 9.86 | 15.75 | 13.86 |
| 2,2-dimethylbutane | 44.34 | 53.79 | 58.12 | 72.81 | 57.06 | 73.18 |
| C$_6$ Olefins and/or Diolefins [1] | 10.28 | 12.48 | 8.83 | 7.52 | 5.79 | 2.94 |
| Coke | 18.64 | 15.63 | 8.69 | 3.66 | 10.60 | 3.12 |
| Total Conversion, Wt. Percent | 55.5 | 45.9 | 41.8 | 26.85 | 42.65 | 26.65 |
| Selectivity to Neohexene, Mole Percent | 1.8 | 3.5 | 25.6 | 37.85 | 38.00 | 53.51 |

| Cat. No. | 900-947-5091 | | 900-947-5095 | | 900-947-5096 | |
|---|---|---|---|---|---|---|
| Cat. Composition | MgO-Cr$_2$O$_3$ on Al$_2$O$_3$+0.68% Na (1/8" ext.) | | MgO-Cr$_2$O$_3$ on Al$_2$O$_3$+1.43% Na | | MgO-Cr$_2$O$_3$ on Al$_2$O$_3$+0.47% Na | |
| Feed | Neohexane (pure grade) | | | | | |
| Run No. 1394 | 74 | 76 | 79 | 80 | 81 | 82 |
| Condition: | | | | | | |
| Temperature, °F | 1,006 | 950 | 1,000 | 952 | 1,003 | 993 |
| WHSV | .28 | .58 | .64 | .31 | .39 | .78 |
| Pressure, mm. Hg | 74 | 75 | 80 | 76 | 74 | 82 |
| Length of Run, min | 30 | 15 | 30 | 30 | 30 | 30 |
| Material Balance, Wt. Percent | 97.4 | 97.3 | 98.9 | 100.4 | 97.7 | 98.6 |
| Yield, Wt. Percent on Feed: | | | | | | |
| H$_2$ | 3.39 | 1.03 | 1.65 | .47 | 2.74 | 1.60 |
| C$_1$ | 1.74 | .40 | .57 | .29 | 1.83 | .94 |
| C$_2$ | 2.51 | .51 | .76 | .78 | 1.89 | 1.08 |
| C$_3$ | .61 | .22 | .15 | .08 | .70 | .34 |
| C$_4$ | 5.84 | 2.24 | 3.08 | 2.30 | 5.11 | 2.90 |
| C$_5$ | 1.17 | .22 | .47 | .18 | 1.84 | 1.23 |
| 3,3-dimethylbutene-1 | 13.44 | 12.08 | 15.21 | 10.20 | 13.71 | 13.73 |
| 2,2-dimethylbutane | 53.06 | 77.88 | 71.11 | 83.87 | 54.80 | 67.35 |
| C$_6$ Olefins and/or Diolefins [1] | 5.65 | 3.29 | 2.47 | 1.12 | 8.42 | 6.54 |
| Coke | 12.60 | 2.12 | 4.53 | 0.71 | 8.96 | 4.30 |
| Total Conversion, Wt. Percent | 46.82 | 22.00 | 28.75 | 15.92 | 45.07 | 32.49 |
| Selectivity to Neohexene, Mole Percent | 29.47 | 56.50 | 54.40 | 65.80 | 31.22 | 43.37 |

[1] Includes Benzene.

The data of Table VI show that the sodium level on the catalyst has a very large effect on the selectivity of the catalyst for the dehydrogenation of neohexane to neohexene.

magnesium aluminate spinel support containing about 1 to 40% by weight magnesium oxide.

5. The catalyst composition of claim 4 wherein the alkali metal is present in an amount of about 0.4 to 0.6% by weight as the alkali metal oxide.

6. The catalyst of claim 4 wherein the alkali metal oxide is sodium oxide.

7. A process for the dehydrogenation of an aliphatic hydrocarbon of 2 to 20 carbon atoms which consists essentially of contacting the hydrocarbon under vapor phase dehydrogenation conditions including a temperature of about 900 to 1250° F. with the catalyst composition of claim 1.

8. The process of claim 7 wherein the temperature is about 1000 to 1150° F.

9. The process of claim 7 wherein the hydrocarbon is a non-acetylenic, aliphatic hydrocarbon of about 4 to 12 carbon atoms.

10. The process of claim 9 wherein the hydrocarbon is a quaternary carbon atom-containing paraffin of 6 to 12 carbon atoms.

11. The process of claim 10 wherein the hydrocarbon is neohexane.

12. A process for the dehydrogenation of an aliphatic hydrocarbon of 2 to 20 carbon atoms which consists essentially of contacting the hydrocarbon under vapor phase dehydrogenation conditions at a temperature of about 900 to 1250° F. with the catalyst composition of claim 5.

13. The process of claim 12 wherein the temperature is about 1000 to 1150° F.

14. The process of claim 12 wherein the hydrocarbon is a non-acetylenic, aliphatic hydrocarbon of about 4 to 12 carbon atoms.

15. The process of claim 14 wherein the hydrocarbon is neohexane.

References Cited

UNITED STATES PATENTS

| 2,500,920 | 3/1950 | Dague et al. | 252—465 |
| 2,992,191 | 7/1961 | Erickson | 252—465 |
| 3,064,062 | 11/1962 | Lorz et al. | 252—465 |
| 3,168,587 | 2/1965 | Michaels et al. | 260—683.3 |

PAUL M. COUGHLAN, JR., *Primary Examiner.*

DELBERT E. GANTZ, *Examiner.*

G. E. SCHMITKONS, *Assistant Examiner.*